United States Patent Office 3,006,965
Patented Oct. 31, 1961

3,006,965
THIOMETHYLALS AND PREPARATION THEREOF
Gerhard Schrader, Wuppertal-Cronenberg, Germany, assignor to Farbenfabriken Bayer Aktiengesellschaft, Leverkusen, Germany, a corporation of Germany
No Drawing. Filed Feb. 12, 1958, Ser. No. 714,696
Claims priority, application Germany Mar. 1, 1957
5 Claims. (Cl. 260—609)

The present invention relates to and has as its objects new and useful thiomethylals of the following general formula

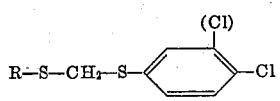

wherein R stands for a cycloalkyl radical or for an alkyl radical having 1–12 carbon atoms which may be substituted, or for the cyano radical, are excellent insecticides. More specifically R stands for cyclo alkyl radicals containing 5 to 6 carbon atoms. The alkyl radical if substituted, preferably bears 1 or 2 substituents of the halogen group especially chlorine and bromine. Another radical which leads to especially useful compounds is a halophenyl especially chlorophenyl mercapto methyl radical.

The new compounds are obtainable by reacting α-chloromethyl-(4-chlorophenyl)-thioether or α-chloromethyl-(3.4-dichlorophenyl)-thioether, with the corresponding aliphatic or cycloaliphatic mercaptans or with alkali metal salts of thiocyanic acid, with or without acid-binding agents.

This reaction may be seen from the following formula

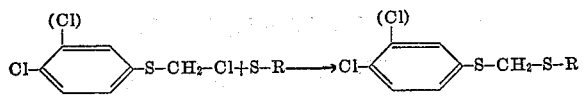

In this formula R has the same significance as shown above.

It is also possible when starting from any desired aliphatic or cycloaliphatic mercaptans, to convert the latter with formaldehyde and hydrochloric acid into the α-chloromethyl compounds and to react the α-chloromethyl compounds with the corresponding chlorophenyl mercaptans.

This reaction may be seen from the following formula

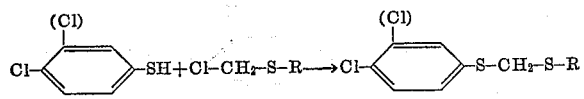

In this formula R has the same significance as shown above.

The preparations obtainable according to this process are chiefly water-insoluble oils, some of which may be distilled without decomposition under a high vacuum. Partly, solid compounds are obtained which may be recrystallized from suitable organic solvents.

The new compounds are distinguished by an insecticidal activity. It is a characteristic feature of most of the compounds of this class to have a distinct acaricidal action. The compounds according to the invention are employed in a manner commonly used for plant-protecting agents, i.e. they are preferably used in combination with liquid or solid diluents or fillers. Fillers and diluents of this kind are for example talcum, chalk, bentonite, and alumina, on the one hand, or, in the case of liquid agents, preferably water (if desired in combination with a commercial emulsifier, such as preferably aromatic polyglycolethers e.g. a commercially available benzylhydroxy diphenyl polyglycolether containing about 15 glycol residues) as well as low molecular weight alcohols, hydrocarbons and the like. A preferred method of application consists in using a dusting or spraying process.

As an example for the special utility of the inventive compounds the compounds of the following formulae

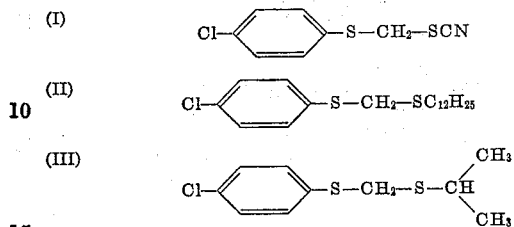

have been tested against spider mites (tetranychus althaeae Hanst) and caterpillars (larvae of diamond black moth). Tests have been carried out as follows: plants (nasturtium plants in case of spider mites and white cabbage in case of caterpillars) have been sprayed drip wet. Killing rate has been determined after 24 hours. The following results have been obtained:

(I) Spider mites, 0.1%, 100%

(II) Spider mites, 0.1%, 100%

(III) Caterpillars, 0.1%, 100%.

The solutions of the active ingredients have been prepared as follows: equal amounts of active ingredient and dimethyl formamide have been mixed, whereafter 20% by weight referred to active ingredient of a commercially available emulsifier (such as benzylhydroxy diphenyl polyglycolether containing about 15 glycol residues) are added. This premixture then is diluted with water to a concentration of 0.1%.

The following examples are given by way of illustration only without, however, limiting the present invention thereto:

Example 1

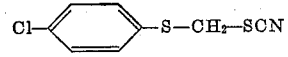

21 grams of sodium thiocyanate are dissolved in 80 millilitres of methanol. 59 grams of α-chloromethyl-(4-chlorophenyl)-thioether are added at 50° C. with stirring whilst maintaining the temperature at 50° C. for 2 hours. The mixture is then cooled to room temperature, the sodium chloride formed is filtered off by suction and the solvent removed by vacuum distillation. After standing for a brief period, the residue solidifies. Upon recrystallisation from ligroin, 45 grams of α-methyl thiocyanate-(4-chlorophenyl)-thiomethylal of M.P. 69° C. is obtained.

Administered to the rat per os 1000 mg./kg. do not show any symptoms. 0.0001 percent solutions kill mosquito larvae 100%, 0.1 percent solutions kill red spider mites and black bean aphids completely.

Example 2

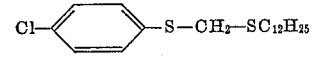

50 grams of α-chloromethyl-(4-chlorophenyl)-thioether are added with stirring to a mixture of 50 grams of dodecyl mercaptan, 80 grams of a sodium ethylate solution (¼ mol of sodium ethylate) and 100 millilitres of anhydrous alcohol. The temperature spontaneously rises to 65° C. The temperature is maintained at 60° C. for a further hour, the mixture is then cooled and the reaction product is introduced into water. The precipitated oil is taken up in benzene, the benzenic solution is washed with water and dried over sodium sulfate. After removal of the solvent by vacuum distillation 83 grams of p-chlorophenyl-dodecylthiomethylal of B.P. 167° C./0.01 mm. Hg are thus obtained.

Administered orally to the rat, 1000 mg./kg. do not show any symptoms. 0.1 percent solutions kill mosquito larvae, aphids and spider mites completely. Caterpillars are also killed completely with 0.1 percent solutions.

*Example 3*

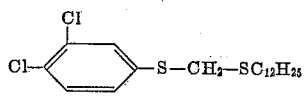

37 grams of 3.4-dichlorophenyl mercaptan are dissolved in 63 grams of a sodium ethylate solution (corresponding to ⅕ mol of sodium ethylate) and 100 millilitres of anhydrous alcohol. 55 grams of α-chloromethyl-dodecyl-thioether (B.P. 135° C./1 mm. Hg) are added to the solution with stirring. The temperature spontaneously rises to 60° C. This temperature is maintained for a further hour and the mixture is then worked up as indicated in Example 2. 64 grams of 3.4-dichlorophenyl-dodecyl-thiomethylal of B.P. 170° C./0.01 mm. Hg are thus obtained.

Orally administered to the rat, 1000 mg./kg. of this compound do not show any symptoms. 0.1 percent solutions kill aphids 100%.

*Example 4*

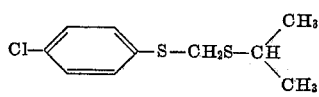

31 grams of α-chloromethyl-isopropyl-thioether (B.P. 145° C./15 mm. Hg) are added dropwise with stirring to a mixture of 39 grams of p-chlorophenyl mercaptan and 78 grams of a sodium ethylate solution (corresponding to ¼ of sodium ethylate) and 100 millilitres of anhydrous alcohol. The temperature rises spontaneously to 60° C. and is maintained for one hour. After working up in usual manner 49 grams (corresponding to 85 percent of the theoretical) of p-chlorophenyl-isopropyl-thiomethylal of B.P. 95° C./0.01 mm. Hg are thus obtained.

Toxicity on the rat orally: LD₅₀ 1000 mg./kg. 0.1 percent solutions kill caterpillars 100%. In a similar manner the following compounds may be obtained:

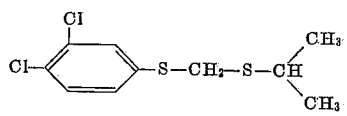

with 0.1 percent solutions caterpillars are killed 80%, B.P. 108° C./0.01 mm. Hg;

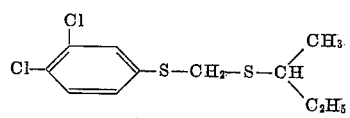

B.P. 115° C./0.01 mm. Hg;

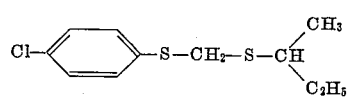

B.P. 100° C./0.01 mm. Hg;

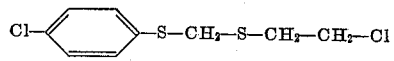

cockroaches are killed completely with solution of 0.1 percent; B.P. 110° C./0.01 mm. Hg;

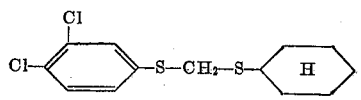

0.1 percent solutions kill black bean aphids 50%; B.P. 137° C./0.01 mm. Hg;

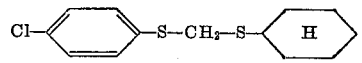

with 0.1% solutions black bean aphids are killed 60%; B.P. 120° C./0.01 mm. Hg;

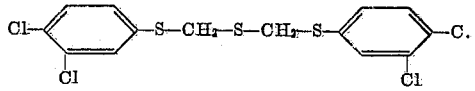

with 0.1 percent solutions spider mites are killed 50%; M.P. 62° C.;

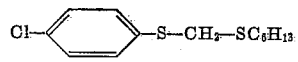

black bean aphids are killed completely with solutions of 0.1%, 0.1% solutions show a strong ovicidal activity against the eggs of red spiders; B.P. 115° C./0.01 mm. Hg;

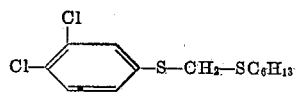

with solution of 0.1% caterpillars are killed 50%; B.P. 130° C./0.01 mm. Hg.

I claim:

1. The compound of the following formula

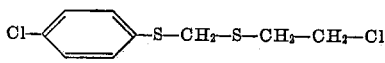

2. The compound of the following formula

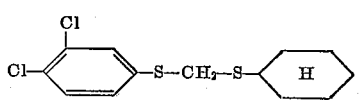

3. The compound of the following formula

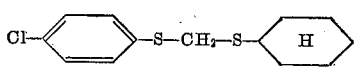

4. The compound of the following formula

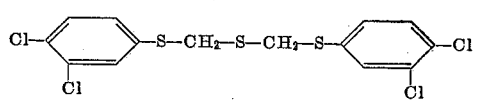

5. A thiomethylal of the general formula

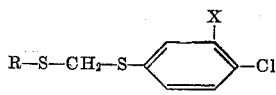

wherein R stands for a member selected from the group consisting of cycloalkyl radicals containing 5 to 6 carbon atoms, chloro-substituted lower alkyl radicals and chloro-substituted phenylmercaptomethyl radicals; and X stands for a member selected from the group consisting of hydrogen and chlorine.

References Cited in the file of this patent

UNITED STATES PATENTS

| | | |
|---|---|---|
| 2,490,875 | Landau | Dec. 13, 1949 |
| 2,617,818 | Mowry | Nov. 11, 1952 |
| 2,645,592 | Campbell | July 14, 1953 |
| 2,665,202 | Mowry | Jan. 5, 1954 |
| 2,743,210 | Jones | Apr. 24, 1956 |
| 2,788,355 | Bullock | Apr. 9, 1957 |
| 2,789,990 | Bullock | Apr. 23, 1957 |
| 2,797,246 | Barber | June 25, 1957 |
| 2,801,261 | Hornberger | July 30, 1957 |
| 2,802,769 | Van Stryk | Aug. 13, 1957 |